US010845587B2

(12) United States Patent
Low

(10) Patent No.: US 10,845,587 B2
(45) Date of Patent: Nov. 24, 2020

(54) MULTI-FACETED MEMS MIRROR DEVICE USEFUL FOR VEHICLE LIDAR

(71) Applicant: Aptiv Technologies Limited, St. Michael (BB)

(72) Inventor: Yew Kwang Low, Singapore (SG)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/667,052

(22) Filed: Oct. 29, 2019

(65) Prior Publication Data

US 2020/0064621 A1 Feb. 27, 2020

Related U.S. Application Data

(63) Continuation of application No. 15/823,726, filed on Nov. 28, 2017, now Pat. No. 10,571,683.

(51) Int. Cl.
| G02B 26/08 | (2006.01) |
| G01S 17/42 | (2006.01) |
| G02B 5/09 | (2006.01) |
| G01S 7/481 | (2006.01) |
| G01S 17/931 | (2020.01) |
| G02B 7/182 | (2006.01) |

(52) U.S. Cl.
CPC ........ *G02B 26/0833* (2013.01); *G01S 7/4817* (2013.01); *G01S 17/42* (2013.01); *G01S 17/931* (2020.01); *G02B 5/09* (2013.01); *B60Y 2400/301* (2013.01); *G02B 7/1821* (2013.01)

(58) Field of Classification Search
None
See application file for complete search history.

(56) References Cited

U.S. PATENT DOCUMENTS

| 5,579,149 | A * | 11/1996 | Moret | G09F 9/372 359/223.1 |
| 6,580,385 | B1 * | 6/2003 | Winner | G01S 13/865 342/70 |
| 6,828,560 | B2 * | 12/2004 | Lambert | G01J 5/0022 250/353 |
| 7,301,684 | B2 * | 11/2007 | Yamazaki | G02B 17/004 359/212.1 |
| 7,614,768 | B2 * | 11/2009 | Stanitzok | B60Q 1/302 362/327 |
| 7,742,218 | B2 * | 6/2010 | Ichikawa | G02B 26/0841 359/290 |
| 8,837,034 | B2 * | 9/2014 | Quin | G02B 26/02 359/290 |
| 9,128,190 | B1 * | 9/2015 | Ulrich | G02B 26/08 |
| 9,664,896 | B1 * | 5/2017 | Yasumura | G02B 26/0833 |
| 9,736,346 | B2 * | 8/2017 | Baek | H04N 5/23212 |
| 10,571,683 | B2 * | 2/2020 | Low | G02B 5/09 |
| 2003/0184843 | A1 * | 10/2003 | Moon | G02B 26/0833 359/290 |

(Continued)

Primary Examiner — Jennifer D. Carruth
(74) Attorney, Agent, or Firm — Colby Nipper PLLC

(57) ABSTRACT

An illustrative example MEMS device includes a base and a plurality of mirror surfaces supported on the base. The plurality of mirror surfaces are respectively in a fixed position relative to the base. The plurality of mirror surfaces are at respective angles relative to a reference surface. The respective angles of at least some of the mirror surfaces are different from the respective angles of at least some others of the mirror surfaces.

21 Claims, 6 Drawing Sheets

(56) References Cited

U.S. PATENT DOCUMENTS

| | | | |
|---|---|---|---|
| 2006/0082860 A1* | 4/2006 | Huibers | G02B 26/0833 359/291 |
| 2006/0119919 A1* | 6/2006 | Watson | G02B 5/005 359/214.1 |
| 2008/0049291 A1* | 2/2008 | Baek | G02B 5/188 359/223.1 |
| 2014/0192399 A1* | 7/2014 | Pilossof | G02B 26/0841 359/291 |
| 2016/0033757 A1* | 2/2016 | Kurtz | G02B 26/0833 359/292 |
| 2016/0071416 A1* | 3/2016 | Kim | B60T 7/22 701/70 |
| 2016/0170308 A1* | 6/2016 | Patra | G02B 5/09 355/71 |
| 2017/0176338 A1* | 6/2017 | Wu | G02F 1/29 |
| 2018/0329037 A1* | 11/2018 | Bozchalooi | G01S 17/931 |
| 2018/0348507 A1* | 12/2018 | Packirisamy | H04J 14/0215 |

\* cited by examiner

MULTI-FACETED MEMS MIRROR DEVICE USEFUL FOR VEHICLE LIDAR

CROSS-REFERENCE TO RELATED APPLICATION

This is a continuation application and claims the benefit under 35 U.S.C. § 120 of U.S. patent application Ser. No. 15/823,726, filed Nov. 28, 2017, the entire disclosure of which is hereby incorporated herein by reference.

BACKGROUND

Advances in electronics and technology have made it possible to incorporate a variety of advanced features on automotive vehicles. Various sensing technologies have been developed for detecting objects in a vicinity or pathway of a vehicle. Such systems are useful for parking assist and cruise control adjustment features, for example.

More recently, automated vehicle features have become possible to allow for autonomous or semi-autonomous vehicle control. For example, cruise control systems may incorporate LIDAR (light detection and ranging) for detecting an object or another vehicle in the pathway of the vehicle. Depending on the approach speed, the cruise control setting may be automatically adjusted to reduce the speed of the vehicle based on detecting another vehicle in the pathway of the vehicle.

There are different types of LIDAR systems. Flash LIDAR relies upon a single laser source to illuminate an area of interest. Reflected light from an object is detected by an avalanche photodiode array. While such systems provide useful information, the avalanche photodiode array introduces additional cost because it is a relatively expensive component. Additionally, the laser source for such systems has to be relatively high power to achieve sufficiently uniform illumination of the area of interest.

Scanning LIDAR systems utilize different components compared to flash LIDAR. One challenge associated with previously proposed scanning LIDAR systems is that additional space is required for the scanning components and there is limited packaging space available on vehicles. Optical phase array LIDAR systems utilize beam multiplexing that tends to introduce relatively significant power loss. Liquid crystal waveguides have even lower efficiency. In either case additional optical components are required for alignment and highly precise alignment accuracy is necessary.

Other aspects of previously proposed LIDAR systems include drawbacks. For example, two-dimensional scanning MEMS (micro-electro-mechanical system) mirrors are not suitable for use in environments subject to vibrations, such as automotive applications. Although one-dimensional MEMS mirrors are robust against vibrations they require multiple laser sources and respective mirrors to achieve an adequate field of view. The duplication of components in such systems increases cost and size requirements, both of which are considered undesirable.

There is a need for improvements in components for systems, such as LIDAR systems, that are lower-cost, easier to fit within small packaging constraints, and utilize power efficiently.

SUMMARY

An illustrative example MEMS device includes a base and a plurality of mirror surfaces supported on the base. The plurality of mirror surfaces are respectively in a fixed position relative to the base. The plurality of mirror surfaces are at respective angles relative to a reference. The respective angles of at least some of the mirror surfaces are different from the respective angles of at least some others of the mirror surfaces.

Various features and advantages of at least one disclosed example embodiment will become apparent to those skilled in the art from the following detailed description. The drawings that accompany the detailed description can be briefly described as follows.

DETAILED DESCRIPTION

Figure 1:
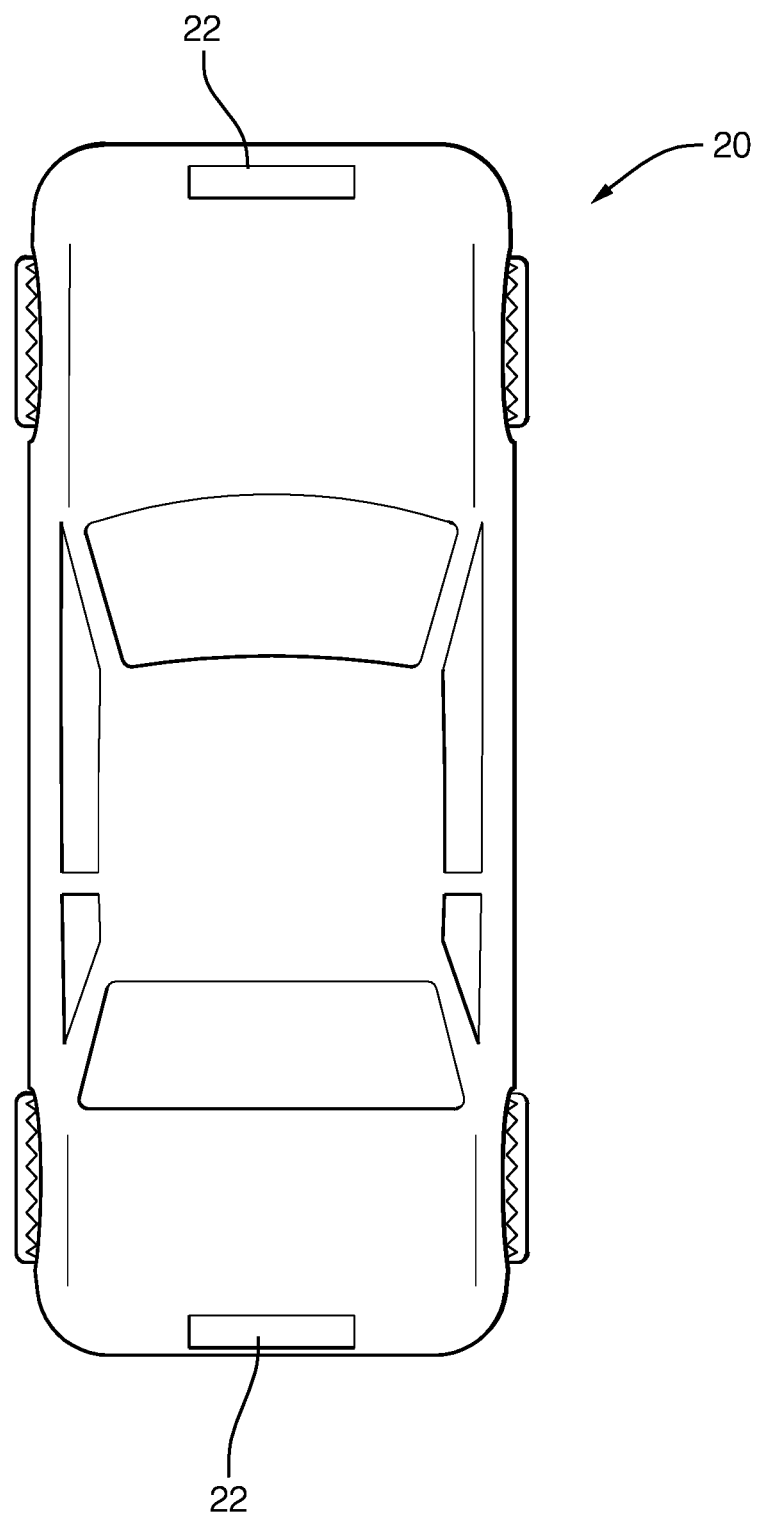
FIG. 1 schematically illustrates a vehicle including a detection device designed according to an embodiment of this invention.

FIG. 1 schematically illustrates a vehicle 20 including a detection device 22. One example use for the detection device 22 is to provide sensing or guidance information for a vehicle, engine or brake controller, such as an automated vehicle controller. For discussion purposes, the detection device 22 is a LIDAR device that emits at least one beam of radiation that is useful for detecting objects in a vicinity or pathway of the vehicle 20. In this example, the beam of radiation comprises light directed at a selected angle relative to the vehicle 20.

Figure 2:
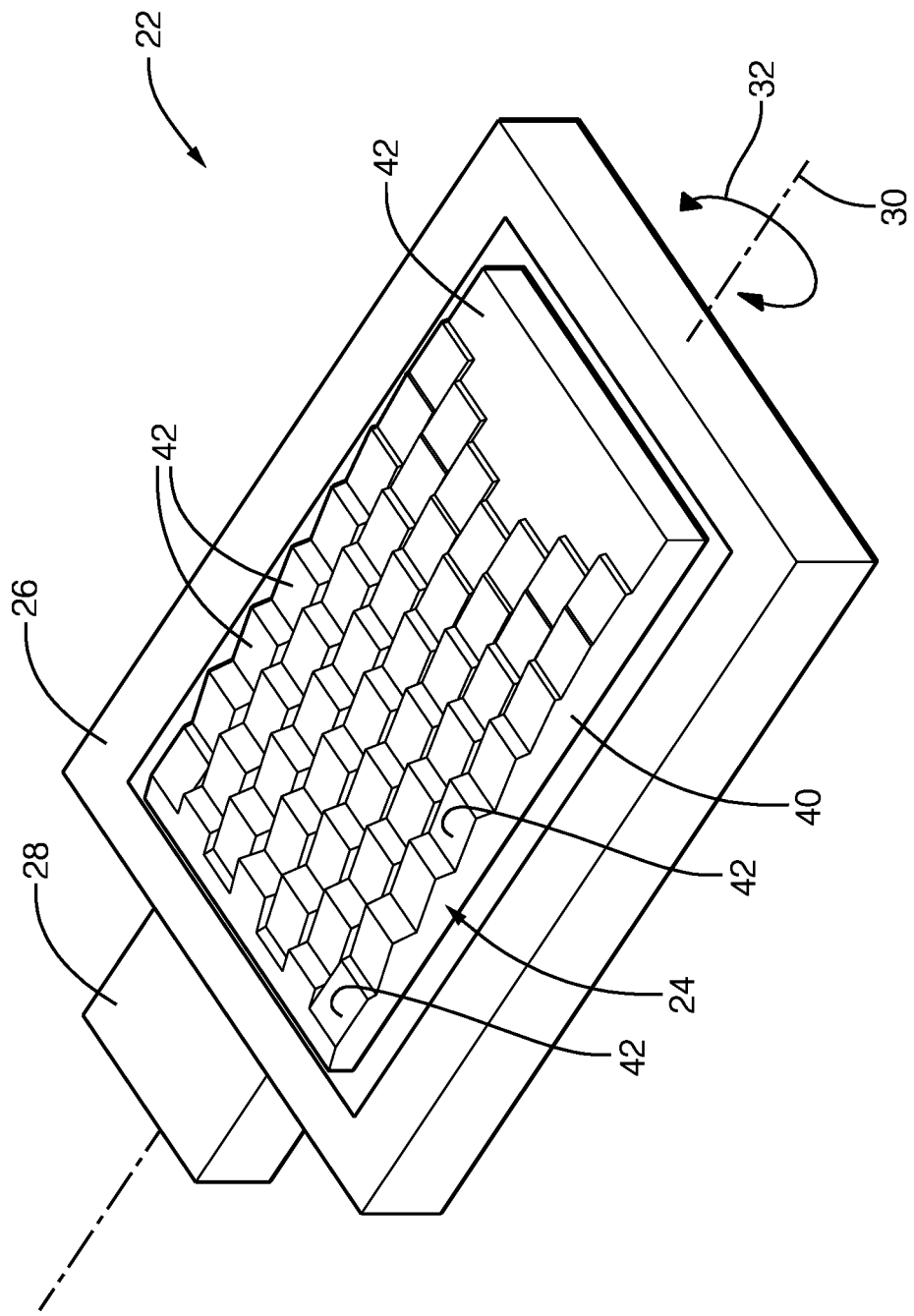
FIG. 2 schematically illustrates selected portions of an example device designed according to an embodiment of this invention.

FIG. 2 schematically illustrates selected portions of the detection device 22 including a multifaceted reflector 24. The reflector 24 has several features that are useful, alone or together, for achieving a desired radiation or light pattern, such as a LIDAR beam. The reflector 24 provides the stability of a one-dimensional MEMS mirror device yet is able to provide a two-dimensional scanning area while reducing the number of components needed for LIDAR applications, reducing or eliminating a need for high precision assemblies, and reducing power loss. With the reflector 24, the detection device 22 is more efficient from a performance and a cost perspective.

The reflector 24 is supported by a support 26 in a manner that allows an actuator or moving mechanism 28 to cause pivotal or rotary movement of the reflector 24 about an axis 30 as schematically represented by the arrows 32. Rotary or pivotal movement in this example includes relatively minor angular changes in the position of the reflector 24, such as 20°, and does not require full rotation about the axis 30. In some embodiments, the reflector 24 is moveable relative to the support 26 while in other embodiments, the moving mechanism 28 causes movement of the support 26 with the reflector 24. The moving mechanism 28 in some example embodiments includes a known MEMS actuator configuration that is capable of causing the desired pivotal or rotary motion.

Figure 3:
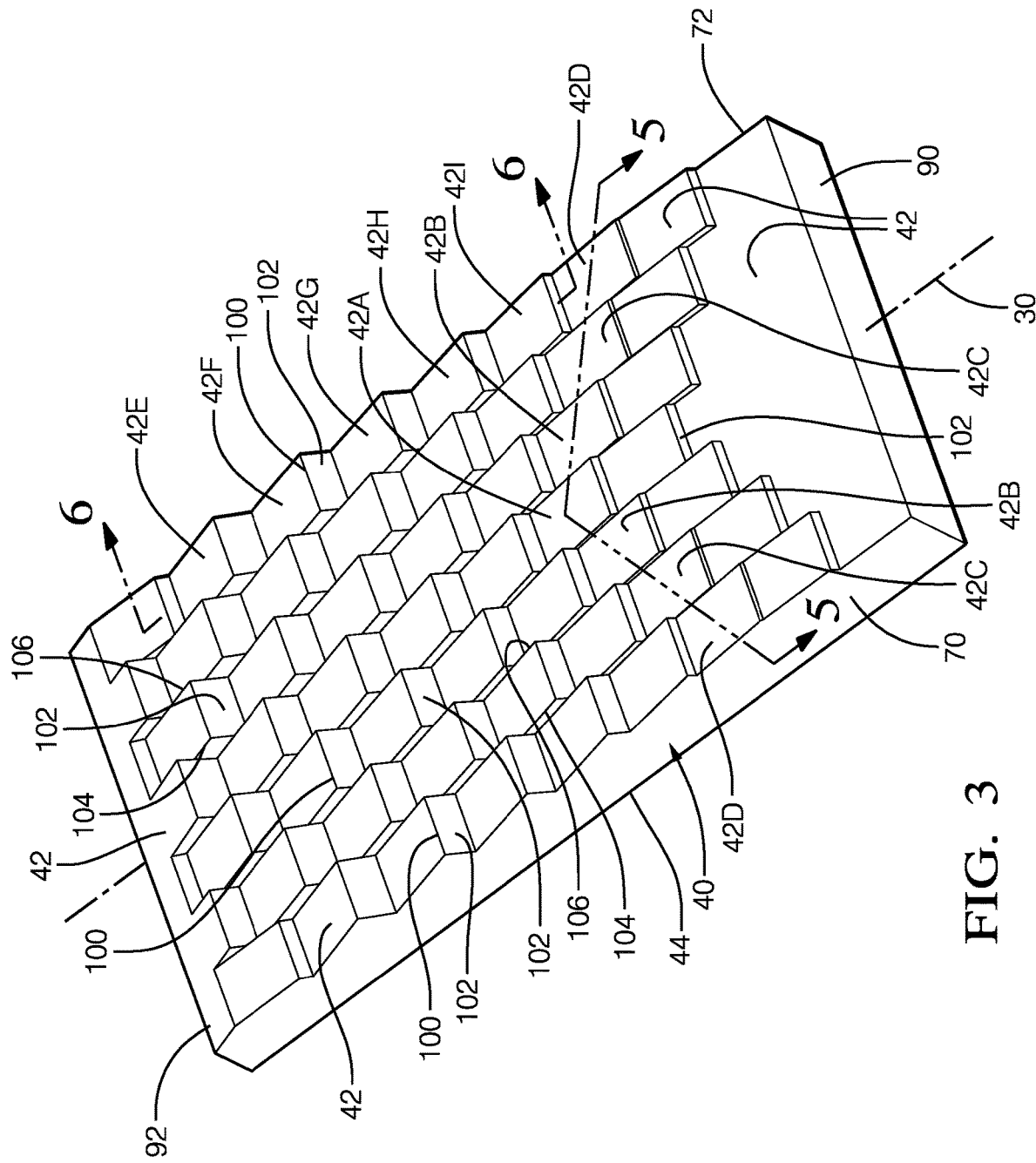
FIG. 3 schematically illustrates an example embodiment of a MEMS mirror component.

As can be appreciated from FIGS. 2 and 3, the multifaceted reflector 24 includes a base 40 and a plurality of mirror surfaces 42 that are fixed relative to the base 40 and oriented at respective angles relative to a reference defined by the base 40. In some examples, a flat, bottom surface 44 of the base 40 serves as a reference surface for measuring or defining the respective angles of the mirror surfaces 42. In this example, at least some of the mirror surfaces 42 are oriented or situated at respective angles that are different than the angles of at least some others of the mirror surfaces 42.

Figure 4:
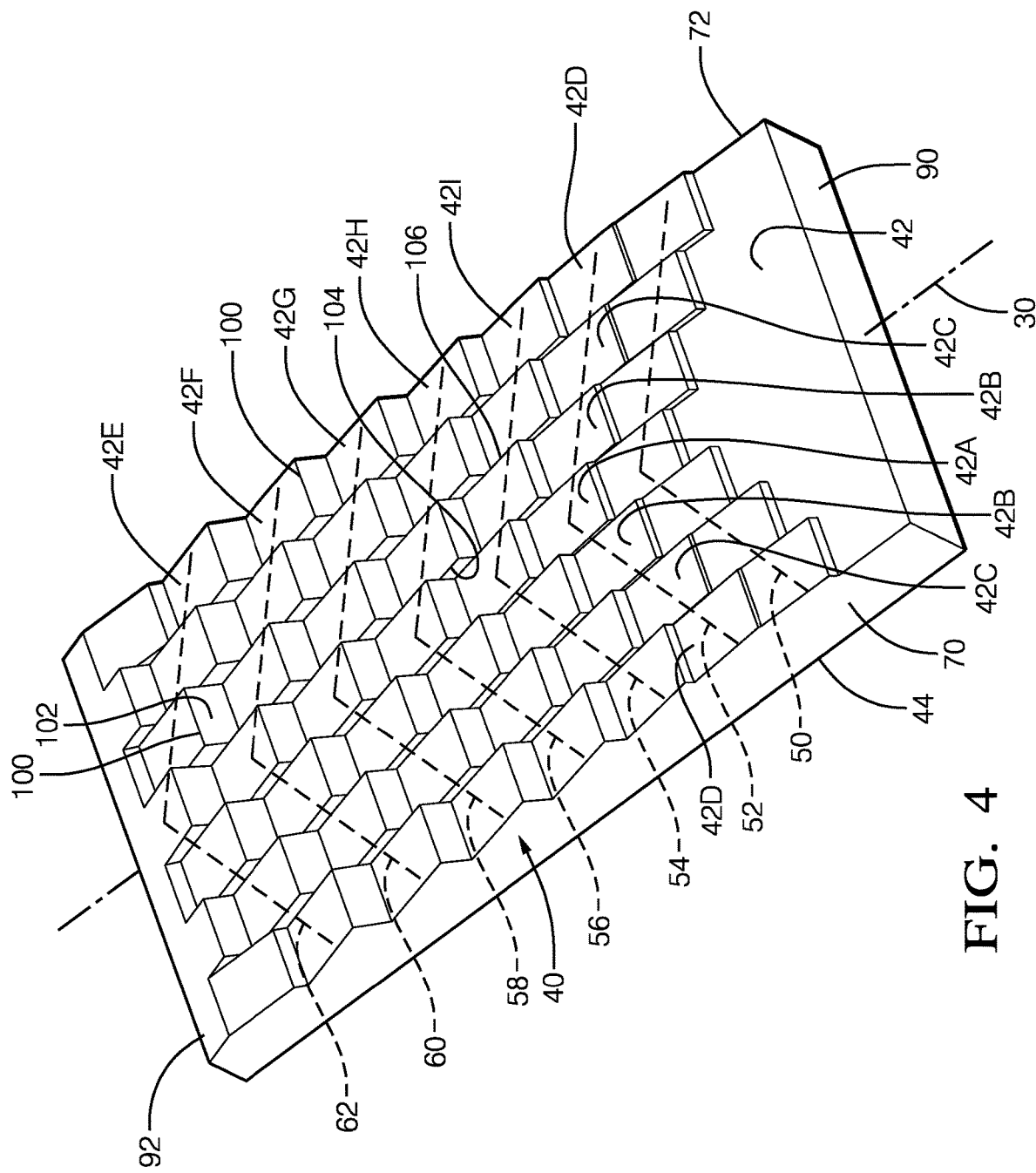
FIG. 4 schematically illustrates selected features of the embodiment of FIG. 3.

FIG. 4 illustrates one aspect of the arrangement of the mirror surfaces 42. The illustrated example embodiment includes the mirror surfaces 42 arranged in a chevron pattern including a plurality of chevrons. The broken lines in FIG. 4 provide a visual indication of which of the mirror surfaces 42 are considered in a particular chevron and are not intended to indicate any physical marking on the reflector 24. This example includes chevrons 50, 52, 54, 56, 58, 60 and 62. In this example, the peak of each chevron is centered on the reflector 24 and the chevrons are symmetric about the longitudinal center of the reflector 24, which coincides with the axis 30 of FIG. 2.

Figure 5:
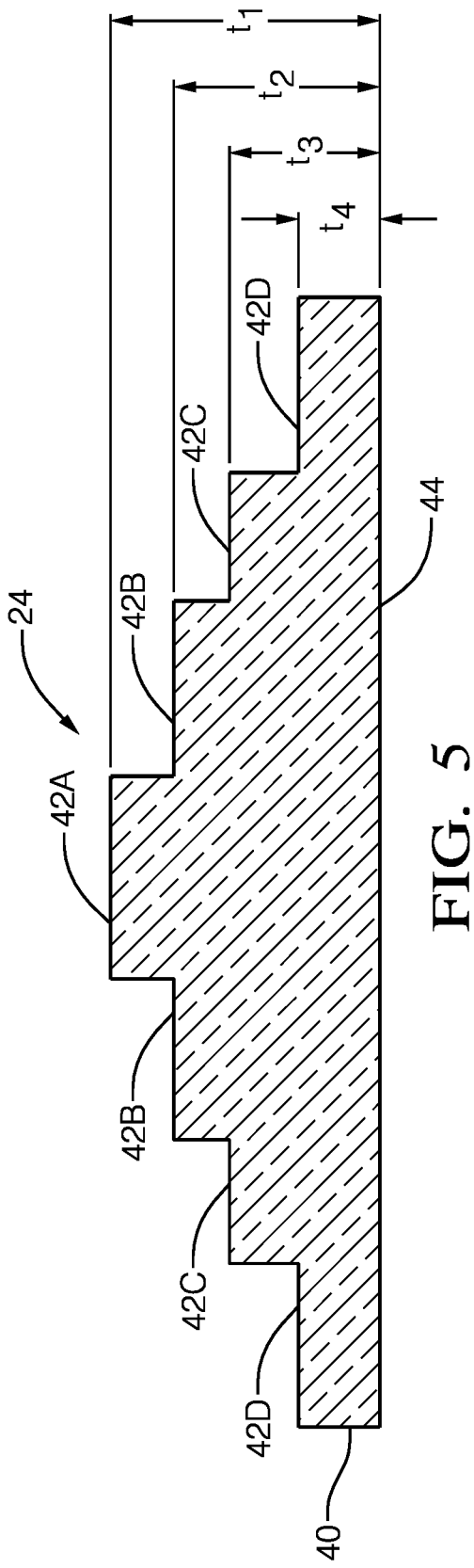
FIG. 5 schematically illustrates selected features of the embodiment of FIG. 3 considered along the section lines 5-5 in FIG. 3.

FIG. 5 illustrates one feature of the mirror surfaces 42 in each chevron of this embodiment. The thickness of the reflector 24 varies along the respective chevrons with a greatest thickness near a center or peak of the chevron and a smallest thickness near the lateral edges 70, 72 of the reflector 24. In FIG. 5, the thickness of the reflector from the bottom surface 44 to the mirror surface 42A is a first thickness t1. The mirror surfaces 42B on either side of the mirror surface 42A are at a second height established by a second thickness t2 of the reflector 24. The second thickness t2 is smaller than the first thickness t1. The mirror surfaces 42C that are adjacent and lateral to the mirror surfaces 42B are closer to the surface 44 and the reflector has a third thickness t3 at the locations of the mirror surfaces 42C. The third thickness t3 is greater than a fourth thickness t4 at the location of the outermost mirror surfaces 42D adjacent to the lateral edges 70, 72 of the reflector 24.

Figure 6:
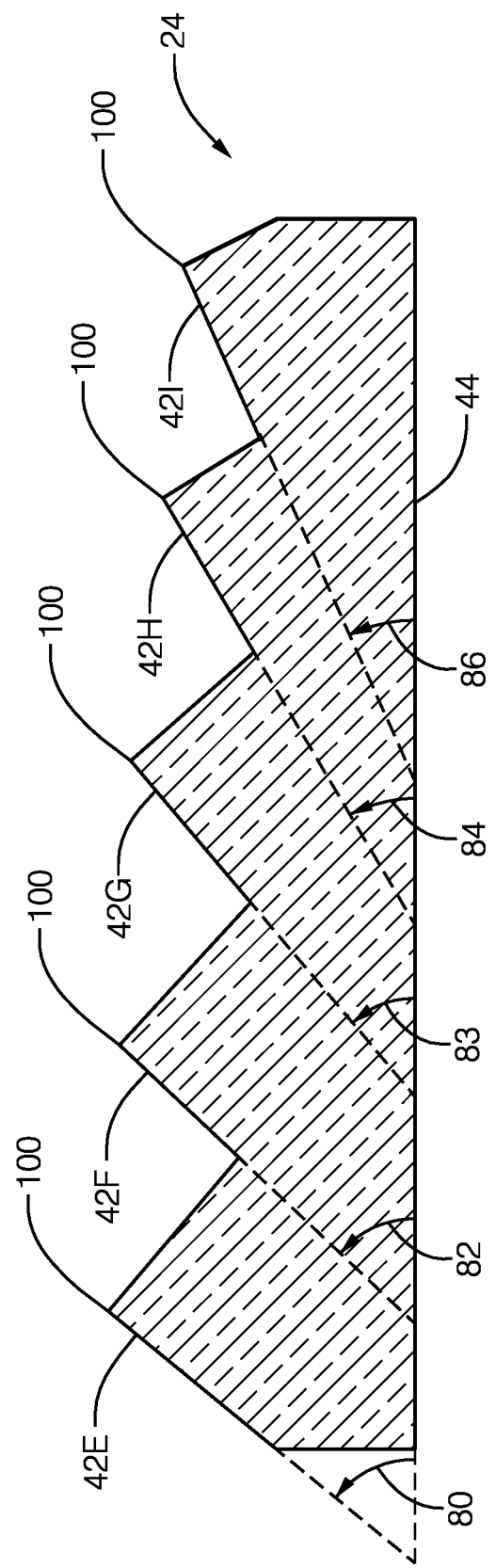
FIG. 6 schematically illustrates selected features of the embodiment of FIG. 3 considered along the section line 6-6 in FIG. 3.

FIG. 6 schematically illustrates another feature of the example embodiment considered along the section line 6-6 in FIG. 3. FIG. 6 shows one way in which the respective angles of the mirror surfaces 42 vary along the reflector 24. A first mirror surface 42E is situated at a first angle at 80 relative to the reference, which is the bottom surface 44 in this example. The broken lines in FIG. 6 are intended to highlight the respective angles of the mirror surfaces and not to show any markings or surface lines on the reflector 24. A second mirror surface 42F is situated at a second angle at 82 that is smaller or less steep than the angle of the first mirror surface 42E. The mirror surfaces 42G-42I are respectively at a smaller or less steep angle at 84, 86, 88 than the adjacent mirror surface. In one embodiment the angles at 80-86 are 63.5°, 61.5°, 58.5°, 57.5°, and 54°, respectively, as measured relative to the reference surface 44.

The angles 80-86 increase or become steeper along the reflector in a direction from one end 90 to an opposite end 92 for the mirror surfaces that are aligned with each other in rows parallel to the lateral edges 70 and 72.

The respective angles of the mirror surfaces also increase along each chevron in a direction from either lateral edge 70, 72 toward the center of the reflector or the peak of the chevron. Each of the mirror surfaces 42 at the center or peak of the corresponding chevron in the center row of the illustrated example is at a steeper angle compared to any other mirror surfaces in the same chevron. Taking the mirror surfaces 42A-42D in FIG. 3 as examples, the mirror surface 42A is situated at an angle of 53°, the mirror surfaces 42B are each situated at an angle of 52°, the mirror surfaces 42C are oriented at an angle of 51° and the mirror surfaces 42D are at an angle of 50°.

The inter-element angular interval, which is the difference between the angles of adjacent mirror surfaces 42 in the chevrons, varies depending on how close the corresponding chevron is to the end 90 or 92. The chevrons 50 and 52, for example, are closer to the end 90 and have a greater inter-element angular interval compared to the other chevrons. The chevron 62, which is closest to the end 92, has the smallest inter-element angular interval. As mentioned above, the mirror surface 42 in the center or peak of the corresponding chevron is at a steeper angle compared to those closer to the lateral edges 70, 72 of the reflector 24. The inter-element angular interval in the chevrons 50 and 52 includes a full degree difference between each adjacent two mirror surfaces in the corresponding chevron and a total angular difference of three degrees between the steepest and shallowest angles of the corresponding chevron. The angle of the mirror surface 42A is three degrees greater than that of the mirror surfaces 42D in this example.

In the chevron 62, for example, the inter-element angular interval is one-half of one degree among adjacent mirror surfaces in that chevron. The mirror surface angle at the center of the reflector and the peak of the chevron 62 is 65° and the mirror surface angle of the mirror surfaces at the edges 70 and 72 is 63.5° for a total angular difference of 1.5° along the chevron 62.

The inter-element angular interval also varies among the mirror surfaces in corresponding rows aligned with the lateral edges 70, 72. The angular difference between adjacent mirror surfaces 42 in the same row and closer to the end 90 is as much as 4° in the illustrated example embodiment while the inter-element angular interval is 2° between adjacent mirror surfaces 42 closer to the end 92.

In the illustrated example, the angles of the mirror surfaces 42 range from 45° to 65° relative to the surface 44 as a reference. Those skilled in the art who have the benefit of this description will realize what specific angles will meet their particular needs. Having multiple angles provides coverage over a selected beam width or angle in at least one direction. A beam for vehicle LIDAR is usually considered to have a vertical and a horizontal angular coverage or spread. For example, the angles of the mirror surfaces 42 provide the vertical angular coverage while the moving mechanism 28 causes movement of the reflector 24 to provide the horizontal angular spread.

Figure 7:
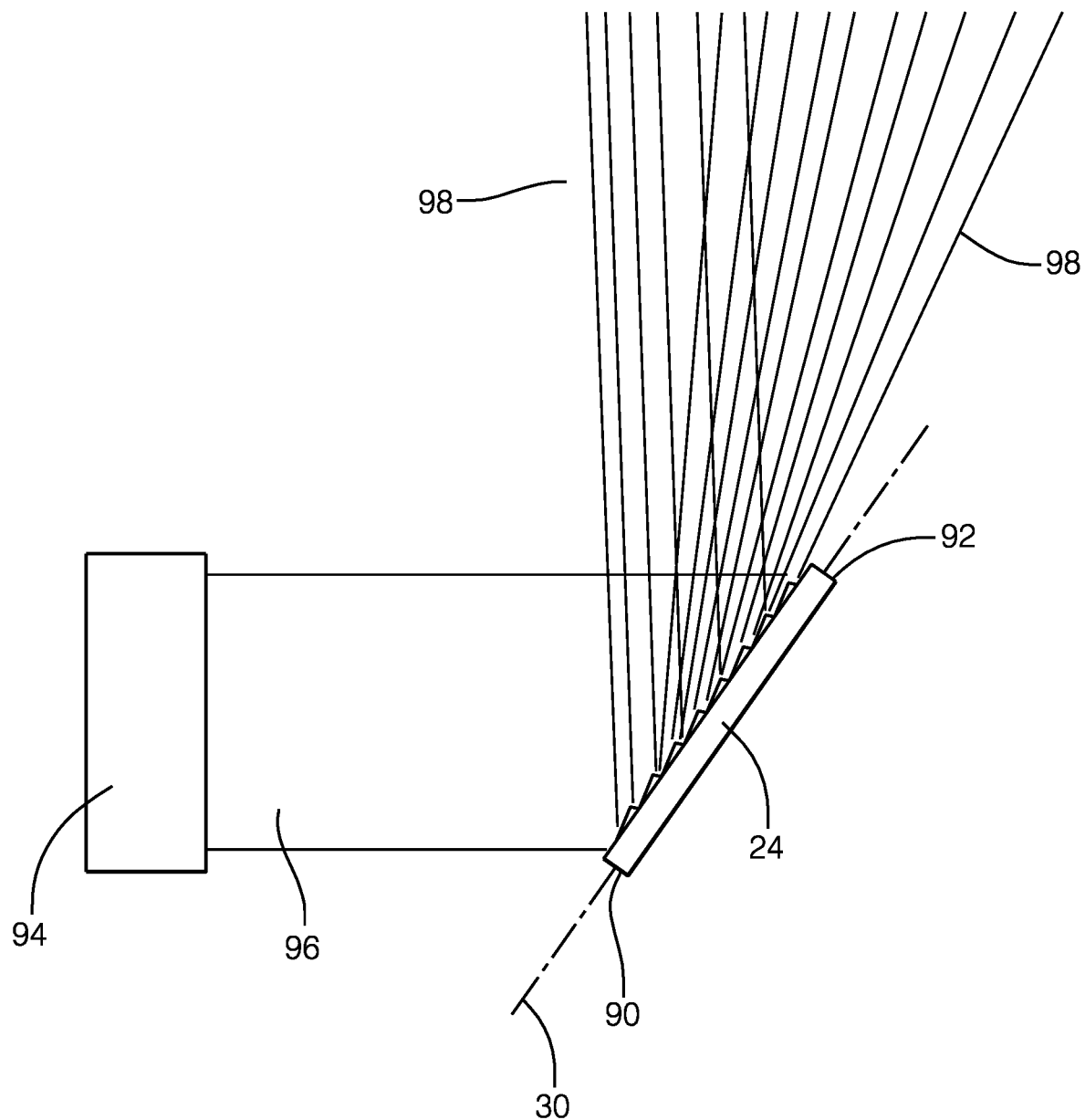
FIG. 7 schematically shows a performance feature of the illustrated example embodiment.

FIG. 7 schematically shows a source 94 that emits radiation such as light schematically shown at 96. The mirror surfaces 42 of the reflector 24 reflect the light 96 as schematically shown at 98 and spread that light across an angular coverage that results from the different angles at which the mirror surfaces 42 are situated on the reflector 24. The way in which the mirror surfaces 42 reflect the light as schematically shown at 98 provides coverage in one dimension (e.g., vertical) and movement of the reflector 24 as caused by the moving mechanism 28 provides coverage in a second dimension (e.g., horizontal). The moving mechanism 28 moves the reflector 24 about the axis 30 in a manner that effectively moves or spreads the beam 98 into and out of the page of the drawing. The moving mechanism 28 moves the reflector at a high frequency scanning rate in the example embodiment.

The end 90 of the reflector 24 is closer to the source 94 than the end 92 in the arrangement shown in FIG. 7. The angles of the mirror surfaces 42 closer to the edge 90 are more acute or shallower relative to the reference (i.e., the surface 44) and are, therefore, more shallow relative to the source 94. The mirror surfaces 42 that are further from the source 94 and closer to the end 92 of the reflector 24 are at steeper angles relative to the source 96. For example, the mirror surfaces 42 closest to the source may be at 45° relative to the reference. The mirror surfaces furthest from the source 94 may be at 65° relative to the reference. The base 40 of the reflector may be at an angle of 45° relative to the direction of light emission from the source 94.

As described above, the chevrons 50-54 for example have a larger inter-element angular interval, which provides a larger total angular coverage compared to the chevrons 58-62 for example, which are further from the source 94. The shallower angled mirror surfaces 42 nearer to source 94 project a larger spot compared to the deeper angled mirror surfaces 42 further from the source. The example mirror surface angle pattern creates a reflection pattern that covers as much as possible of the region within the detector device field of view in one direction (e.g., vertically) without leaving any space uncovered by the reflected radiation beams in that direction (e.g., the vertical scale).

Compared to a two-dimensional scanning MEMS mirror the reflector 24 spreads the beam 98 to cover the required vertical field, for example, so that only one direction of scanning (e.g., horizontal) is required to achieve scanning to cover a two-dimensional field of view or beam range. Known two-dimensional scanning MEMS devices typically require scanning in two directions that limits the frequency of the scanning at a very low frequency along either of the axes. Control is definitely more complex and unstable for such two-dimensional scanning MEMS mirrors compared to the detector device 22. The illustrated example embodiment of the reflector 24 provides the stability and advantages of a one-dimensional MEMS mirror while also achieving the type of coverage that is possible with two-dimensional devices as the moving mechanism 28 moves the reflector 24 about the axis 30 at a high frequency.

The reflector 24 also has a plurality of peaks 100. The mirror surfaces 42 are on one side of each peak 100 and second surfaces 102 are on an opposite side of each peak. In this example the second surfaces 102 are mirrored but in some examples the second surfaces 102 are not reflective. Each mirror surface 42 has two edges 104, 106 extending from the corresponding peak 100 toward the base 40. The edges 104 and 106 are situated at the angle of the corresponding mirror surface 42. The edges 104 and 106 of the mirror surfaces 42 are all parallel to each other in this example and all of the peaks 100 are parallel to each other. Most of the mirror surfaces 42 are rectangular although at least those closest to the ends 90 and 92 have a more complex geometry.

Embodiments of this invention provide LIDAR scanning capability useful for automated vehicles while requiring lower power and occupying less space compared to other proposed arrangements. The fixed position of the mirror surfaces 42 and the respective angles of them allows for achieving coverage in one field direction and the stability needed to scan at a high frequency in a second field direction.

While the illustrated example embodiment includes various features such as different ways that the angles of the mirror elements vary along the reflector, not all of those features are necessary to realize the benefits of embodiments of this invention for all applications. It may be possible to use some of the inter-element angular interval configurations of the example reflector without using all of them or to vary the pattern of the mirror surfaces from the illustrated example. Those skilled in the art who have the benefit of this description will realize what other embodiments of this invention will suit their particular needs.

The preceding description is exemplary rather than limiting in nature. Variations and modifications to the disclosed example embodiment and features may become apparent to those skilled in the art that do not necessarily depart from the essence of this invention. The scope of legal protection given to this invention can only be determined by studying the following claims.

I claim:

1. A MEMS device, comprising:
a plurality of mirrors attached to a same base;
the plurality of mirrors forming an arrangement having a V-shape with an apex of the arrangement aligned with an axis of rotation of the base; wherein
the plurality of mirrors have progressive angles of inclination relative to a plane parallel to the axis of rotation.

2. The MEMS device of claim 1, wherein the angles of inclination increase from sides of the base to the apex of the arrangement.

3. The MEMS device of claim 1, wherein a plurality of nested arrangements extend from a first end of the base to a second end of the base opposite the first end;
the apex of each nested arrangement aligned along the axis of rotation of the base.

4. The MEMS device of claim 3, wherein a surface at the first end of the base has an angle of inclination of zero degrees.

5. The MEMS device of claim 3, wherein the plurality of nested arrangements have progressive angles of inclination relative to one another.

6. The MEMS device of claim 5, wherein the progressive angles of inclination of each of the plurality of nested arrangements increase from the first end of the base to the second end of the base.

7. The MEMS device of claim 1, wherein the base is a single unitary base.

8. The MEMS device of claim 1, wherein the plurality of mirrors are permanently attached to the base.

9. The MEMS device of claim 1, wherein the axis of rotation of the base is aligned with a longitudinal axis of the base.

10. A MEMS device, comprising:
a single unitary base; and
a plurality of mirror surfaces permanently placed on the single unitary base;
the plurality of mirror surfaces being at respective angles relative to a reference surface defined by the single unitary base;
wherein the respective angles of at least some of the mirror surfaces are different from the respective angles of at least some others of the mirror surfaces; and
the respective angles are permanently fixed relative to the reference surface.

11. The MEMS device of claim 10, wherein the reference surface is a flat bottom surface of the single unitary base.

12. The MEMS device of claim 10, wherein at least two of the mirror surfaces are at a first one of the respective angles relative to the reference surface.

13. The MEMS device of claim 10, wherein the mirror surfaces are arranged in a V-shaped pattern.

14. The MEMS device of claim 13, wherein a plurality of are nested together on the single unitary base.

15. The MEMS device of claim 14, wherein at least a first one of the mirror surfaces is near an apex of the corresponding V-shaped pattern;
at least a second one of the mirror surfaces is near a lateral end of the corresponding V-shaped pattern;
the first one of the mirror surfaces is at a first one of the respective angles;
the second one of the mirror surfaces is at a second one of the respective angles; and
the first one of the respective angles is steeper than the second one of the respective angles.

16. The MEMS device of claim 10, wherein
a first one of the V-shaped patterns is near one edge of the single unitary base;
a second one of the V-shaped patterns is near an opposite edge of the single unitary base; and
the respective angles of the mirror surfaces of the first one of the V-shaped patterns are greater than the respective angles of the mirror surfaces of the second one of the V-shaped patterns.

17. The MEMS device of claim 16, wherein
a third one of the V-shaped patterns is between the first one of the V-shaped patterns and the second one of the V-shaped patterns;
the respective angles of the mirror surfaces of the third one of the V-shaped patterns are greater than the respective angles of the mirror surfaces of the first one of the V-shaped patterns; and
the respective angles of the mirror surfaces of the third one of the V-shaped patterns are less than the respective angles of the mirror surfaces of the second one of the V-shaped patterns.

18. The MEMS device of claim 10, wherein the mirror surfaces are flat.

19. The MEMS device of claim 10, wherein each of the mirror surfaces is rectangular and has four edges;
two of the edges of each of the mirror surfaces are parallel with two of the edges of others of the mirror surfaces; and
the two of the edges of each mirror surface are at the respective angle of the corresponding mirror surface.

20. The MEMS device of claim 10, wherein the mirror surfaces closer to one end of the single unitary base than an opposite end of the single unitary base are at lower respective angles relative to the reference surface than the mirror surfaces closer to the opposite end.

21. The MEMS device of claim 20, wherein the respective angles progressively increase from the one end of the single unitary base toward the opposite end of the single unitary base.

* * * * *